Jan. 30, 1934.  E. H. SCHMIDT  1,944,953
DRAFT GEAR
Filed Sept. 4, 1930  2 Sheets-Sheet 1
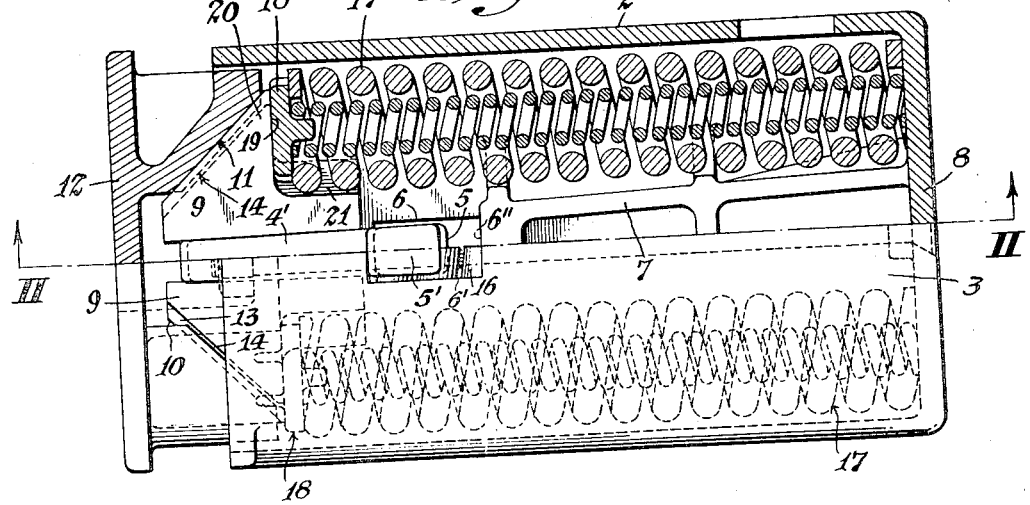
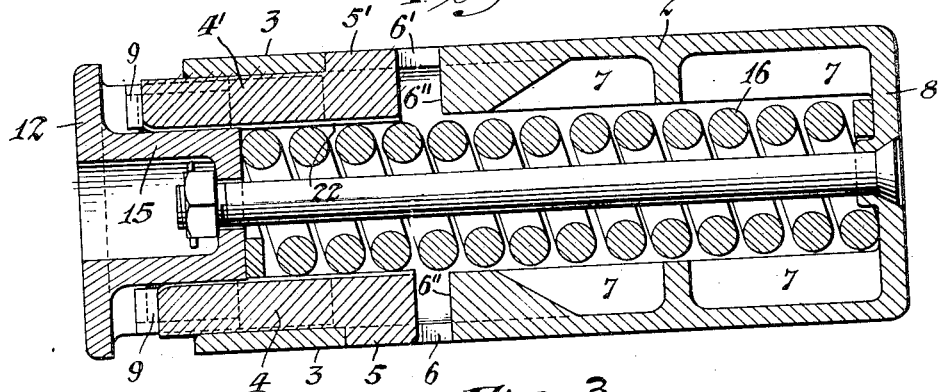
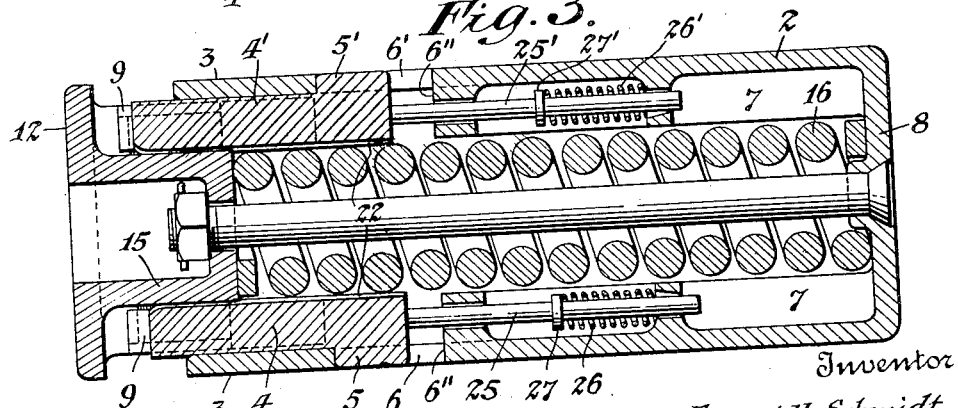
Inventor
Ernest H. Schmidt
By his Attorney
Clarence D Kerr Jan. 30, 1934.  E. H. SCHMIDT  1,944,953
DRAFT GEAR
Filed Sept. 4, 1930   2 Sheets-Sheet 2

INVENTOR
Ernest H. Schmidt
BY
Clarence D. Kerr
HIS ATTORNEY

Patented Jan. 30, 1934

1,944,953

UNITED STATES PATENT OFFICE 1,944,953

DRAFT GEAR

Ernest H. Schmidt, Cleveland Heights, Ohio, assignor to National Malleable and Steel Castings Company, Cleveland, Ohio, a corporation of Ohio Application September 4, 1930. Serial No. 479,636

19 Claims. (Cl. 213—24)

This invention relates to railway draft gears. More particularly, the invention is concerned with improvements in draft gears in which a preliminary spring action is provided for taking care of the normal running tractive effort of a locomotive, supplemented by friction means which, together with the spring means, suffices to cushion impact shocks. An object of the invention is the provision of an improved draft gear wherein abruptness of action of the friction means is avoided and the change from preliminary spring action to frictional resistance is accomplished gradually and smoothly, and in a simple and effective manner. The invention further provides for readily obtaining any of a wide variety of characteristics of draft gear performance, both as to static and dynamic resistance. The invention also comprises other features which will be hereinafter described and claimed.

In the accompanying drawings:

Fig. 1 is a side elevation, partly in section, of a draft gear embodying my invention.

Fig. 2 is a horizontal section taken on line II—II of Fig. 1;

Fig. 3 is a horizontal sectional view of a modified form of the invention; and

Figure 4:
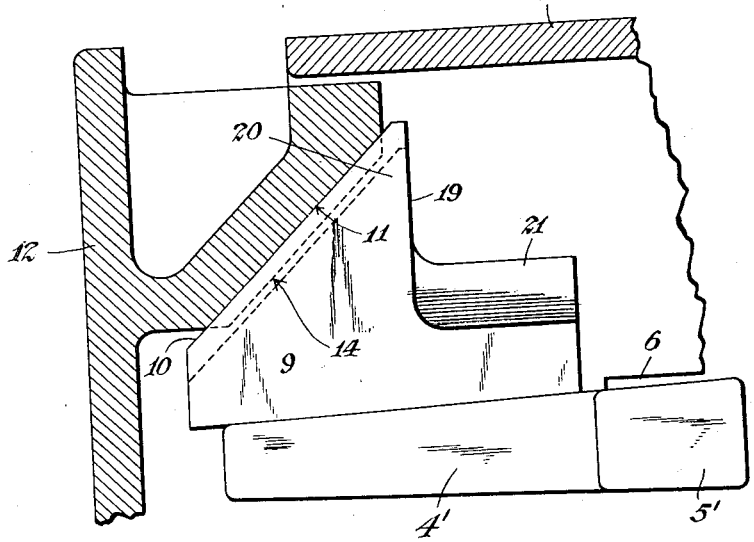
Figures 4 and 5 are diagrammatic views of further modified forms of the invention.

My invention is illustrated in conjunction with a draft gear of the type shown in the application of Ernest H. Schmidt and Hubert L. Spence, Serial No. 319,064, filed November 13, 1928, Patent No. 1,913,414, June 13, 1933. Thus, referring to the accompanying drawings, the draft gear has a case 2, preferably rectangular in form, in opposite sides 3 of which are seated the friction members 4, 4', which are preferably rectangular blocks having at their inner ends lateral projections 5, 5', respectively. In the side walls 3 are recesses 6, 6' for the respective projections 5, 5'; said recesses providing sufficient clearance to permit longitudinal movement of the respective friction members relative to the case 2. To resist the inward thrust of the frictional members 4, 4', the case 2 at the rear of the recesses 6, 6' has abutments 6" against which the members 4 bear at their rear ends, and these abutments 6" are braced by the diverging ribs 7, which extend back to and are merged into the rear end 8 of the case.

On the opposite sides of each of the friction member 4, 4', and in frictional engagement therewith are arranged friction shoes 9, two friction members and four shoes 9 being provided. The inclined forward faces 10 of the shoes 9 are engaged by correspondingly inclined faces 11 of the wedge 12. Each shoe face 10 has also an inclined recess 13 into which fits a correspondingly inclined rib or flange 14 on the wedge 12 for the purpose of maintaining the shoes and wedging faces in alignment and of preventing the shoes 9 from working laterally over to and abrading the sides of the case 2.

The wedge 12 has a central projection 15 which forms a bearing for the forward end of the central spring 16 and also serves to hold the friction members from working inwardly against the spring. The forward ends of the side springs 17, of which two are provided for each pair of shoes, bear against the spring follower 18, and each spring follower bears against the vertically disposed rear faces 19 of the projections 20 on a pair of the shoes 9. Alternatively, separate spring followers, one for each shoe, may be provided in lieu of a single follower for each pair. The backs of the shoes are also recessed at 21, and the friction members at 22, to provide clearance, respectively, for the side springs 17 and the central spring 16.

Under draft or buffing loads set up by the lighter tractive forces of the locomotive the follower wedge, and with it the shoes 9 and friction members 4, 4' are forced inwardly against the resistance of the springs only. This action continues until one or both of the friction members reaches the inward limit of its movement relative to the housing. From that point on to the limit of gear closure the friction member or members remain stationary in the housing and the shoes are forced to move along the member in frictional engagement therewith, developing frictional resistance in addition to spring resistance. The amount of such frictional resistance is dependent on the angle of inclination of the sides of the friction members to the longitudinal axis of the gear. The parts of the gear are proportioned so that just before the springs go solid the wedge will come into engagement with the end of the case and thereby protect the springs against oversolid blows.

In release the frictional grip of the shoes upon the friction members acts to return these members to the forward ends of their respective slots, that is, to the positions shown in Figures 1 and 2.

In the gear shown, the capacity or stiffness of the springs is sufficient, and the lengths of the slots 6, 6' are such that all of the lighter work of the locomotive is resisted by spring action alone, the frictional range being reserved for the heavier work of the locomotive and for impact shocks such as those caused by brake action. The springs are preferably under initial compression when the gear is fully released, so that there can be no substantial looseness of the frictional parts.

In carrying out my invention, I have shown the slot 6' of greater extent than the slot 6, with the result that the friction member 4' and its co-operating friction shoes 9 has a greater floating movement than does friction member 4 with its shoes. Thus, on compression of the gear in either pulling or buffing the friction member 4 comes into action to provide frictional resistance before the member 4'. For example, the length of the slot 6 may be such that longitudinally movement of the member 4 with respect to case 2 is stopped at the end of one inch; and the length of slot 6' such that member 4' is stopped at the end of 1¼" travel longitudinally with respect to the case. By varying the lengths of the slots 6, 6' with respect to each other the change from pure spring action to a substantial frictional resistance may be spread over any length of travel desired.

If desired, one slot may be just long enough to permit insertion of the friction member but not long enough to allow longitudinal movement of said member. In this case frictional resistance will start to build up immediately on compression of the parts.

It will thus be seen a wide range of free spring movement can be obtained by merely changing the length of the slots 6, 6'. This variation in length can be made with very little change in the pattern equipment used, it being only necessary to add or remove small, loose pieces to the pattern to effect the desired result.

While the desired smoothness of transition from pure spring action to frictional resistance may be accomplished by varying the relative lengths of the slots 6, 6', said slots may be of the same length and the same result attained by changing the relative lengths of the projections 5, 5' of the friction members so that the member 4 will have a different length of travel in its slot than will the member 4'.

In Figure 1 the friction member 4 is shown tapered upwardly from front to rear, i. e., so that said member widens toward its rear end. This taper is in a direction for developing a relatively high frictional resistance during the friction part of the compression stroke. It may at this point be noted that, particularly in passenger car service, two distinct conditions are to be taken care of; (1) the steady draw bar pull, and (2) the dynamic or shock action due, for example, to brake application. The action of the gear under both of these conditions should be very smooth and devoid of rapid or sudden change in resistance. I find that the amount of taper given the friction members 4, 4' controls within wide limits the static resistance of the gear, or in other words its stiffness or resistance to steady loads. The greater the upward taper toward the rear, the stiffer is the gear action. I have also found that by varying the angle of the wedge surface 10 against either pair of friction shoes 9 the dynamic resistance of either one of the friction units may be controlled within wide limits; increase in the sharpness of the angle of wedge surface 10 increasing the resistance of the gear to shocks.

Figure 5:
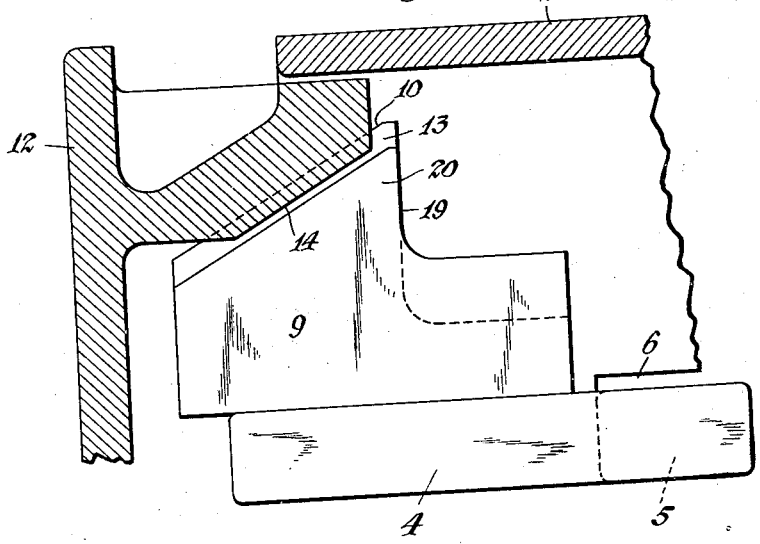

The draft gear of this invention may be considered as comprising two units (each unit consisting of a friction member 4 or 4', the associated pair of shoes 9 and springs 17) co-operating with the follower wedge 12 common to said units; and the action of the gear as a whole is the resultant or combined action of that of the two units. I propose to obtain any of a wide variety of draft gear actions by giving to each of the units appropriate characteristics of its own. Thus each unit may be given a certain amount of free spring action, different from that of the other unit; or a certain taper may be given the friction member 4 and either no taper or another taper to member 4'; or the angle of the wedge surface 10 acting upon the shoes 9 of one unit may be made different from the angle of the wedge surface which engages the shoes of the other unit. In other words, each unit may have characteristics different from that of the other unit, either by varying its free spring action, or by varying the taper of its friction member, or by varying the angle of the associated wedge surface, or through any desired combination of these three factors. In this way any of a wide variety of characteristics of performance of the draft gear as a whole may be obtained. By way of illustration of possible variations in characteristics of the different units aforesaid there are shown in Figures 4 and 5 the upper surfaces of the wedge and the associated upper shoes of the respective units. It will be noted that the angle of the wedge surface of Fig. 4 is different from that of Figure 5. Also the friction member 4 of Figure 5 is shown untapered while the friction member 4' of the other unit (Fig. 4) is tapered.

If desired, means may be provided for further insuring return of the friction members 4, 4' to their released positions. Thus, in Figure 3, each of said friction members is engaged by a corresponding one of a pair of plungers 25, 25'. Said plungers are slidably mounted in the case 2 as shown, and are pressed toward the front end of said case by springs 26, 26', respectively, acting upon shouldered portions 27, 27' of the respective plungers. While I have not found such means necessary to the return of the friction member, it may if desired be provided.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a draft gear, a case, a member movable with respect thereto, means brought into action upon a predetermined extent of movement of said member for frictionally opposing further movement of said member, additional means movable in unison with said first-named means and first brought into frictional action upon movement of said member beyond said predetermined extent for frictionally opposing movement of said member, and spring means in said case opposing movement of said member during said predetermined extent of movement.

2. In a draft gear, a case, movable friction members within said case, shoes frictionally engageable with said members respectively, spring means compressed by said shoes, a wedge engaging said shoes, means comprising a stop on said case for limiting longitudinal movement of one of said friction members with respect to said case, and means comprising another stop on said case for limiting the other of said friction members to a different amount of longitudinal movement with respect to said case.

3. In a draft gear, movable friction members, shoes frictionally engageable with said members respectively, and movable longitudinally therewith a wedge engaging said shoe, means for successively arresting the movement of said friction members and thereby causing friction to be developed first between one of said shoes and its associated friction member and then between another shoe and its associated friction member during the travel of said wedge, and spring means opposing movement of said shoes.

4. In a draft gear, a case, a plurality of friction members mounted in said case, friction shoes cooperating with opposite sides of each of said members, each of said members being positioned between a plurality of said shoes, a wedge having a wedging engagement with said shoes, means limiting longitudinal movement of said friction members with respect to said case, spring means acting directly upon said members for forcing the latter into release position, and spring means for returning the shoes and wedge to normal positions.

5. In a draft gear, a case, a plurality of friction members mounted in said case, friction shoes cooperating with opposite sides of each of said members, a wedge engaging said shoes, means limiting longitudinal movement of said friction members with respect to said case, springs and cooperating plungers acting directly upon said members for forcing the latter into release position, and spring means for returning the shoes and wedge to normal position.

6. In a draft gear, a case, a wedge; a plurality of friction means each comprising a friction member in said case and shoes cooperating with opposite sides of said member and with different portions of said wedge; the parts being so constructed and arranged that the shoes of both said friction means are in engagement with said wedge throughout the entire compression and release of the gear; and one of said means being arranged to provide a greater frictional resistance than the other.

7. In a draft gear, a case, wedging means, a plurality of friction means each comprising a separate friction member loosely mounted in said case and shoes cooperating with opposite sides of said member and engaging certain portions of said wedging means, one of said friction means being arranged to provide a greater frictional resistance than the other of said friction means, and each of said friction means being adapted to develop friction independently of the other.

8. In a draft gear, the combination of a case, a plurality of groups of friction members and a wedge in engagement therewith for actuating the same, springs in said case opposing movement of said groups, each group comprising a pair of shoes and a cooperating friction element positioned between said shoes, the shoes of said groups cooperating with different portions of said wedge, the parts being so constructed and arranged that said wedge engages the shoes of both said groups throughout the entire compression and release of the gear, the members of one of said groups being constructed to provide a frictional resistance different in amount from that of the members of the other of said groups.

9. In a draft gear, a case, a plurality of laterally spaced groups of friction members in said case, each group comprising a pair of shoes and a friction element therebetween, the friction element being engaged on different sides thereof by said shoes, means for moving said groups inwardly in unison, spring means for opposing movement of each group, the first-mentioned means comprising portions having wedging surfaces in engagement with said shoes, each group with its associated spring means and wedging surfaces constituting a friction system, one of said systems being so constructed and arranged as to have a greater friction developing capacity than the other of said systems.

10. In a draft gear, a wedge and a case, a plurality of groups of friction members, a certain member of each group being mounted in said case for longitudinal movement with respect thereto, other members of each group frictionally engaging said certain member thereof and having a wedging engagement with said wedge, springs opposing inward movement of certain of said members, said parts being constructed and arranged to provide for movement of said wedge and members in unison for a part of the travel of the gear and to successively arrest the movement of certain of said members during another part of the travel of the gear.

11. In friction shock absorbing mechanism, a case, a plurality of pairs of friction shoes therein, a plurality of friction members each between the shoes of a corresponding pair, a wedge engaging all of said shoes for forcing them into frictional engagement with their corresponding friction members, and for moving said shoes relative thereto, and a separate spring resisting the movement of each shoe, said elements being so constructed and arranged that one pair of shoes and their friction member develop a greater amount of friction than another pair of shoes and their friction member.

12. In a draft gear, a case, a wedge, a plurality of friction means each comprising a friction member in said case and shoes cooperating with opposite sides of said member and with different portions of said wedge, the parts being so constructed and arranged that the shoes of both said friction means are in engagement with said wedge throughout the entire compression and release of the gear, the friction member of one of said means having a given taper and the friction member of the other of said means having a different taper.

13. In a draft gear, a case, a wedge, a plurality of friction means each comprising a friction member in said case and shoes cooperating with opposite sides of said member and with different portions of said wedge, the parts being so constructed and arranged that the shoes of both said friction means are in engagement with said wedge throughout the entire compression and release of the gear, the wedge surfaces cooperating with one of said means being inclined a greater amount than the wedge surfaces cooperating with the other of said means.

14. In a draft gear, the combination of a case, a plurality of groups of friction members in said case and a wedge in engagement therewith for actuating the same, springs in said case opposing movement of said groups, each group comprising a pair of shoes and a friction element therebetween, the shoes of said groups cooperating with different portions of said wedge, the friction element of one of said groups being shaped to provide in cooperation with the associated shoes a frictional resistance different in amount from that of the friction element of the other of said groups in cooperation with its shoes.

15. In a draft gear, a case, wedging means, a plurality of friction means each comprising a separate friction member loosely mounted in said case and shoes cooperating with opposite sides of said member and engaging certain portions of said wedge means, each of said friction means being adapted to develop friction independently of the other, the wedging surfaces cooperating with one of said means being inclined differently from the wedging surfaces cooperating with the other of said means.

16. In a draft gear, a case, wedging means, a plurality of friction means each comprising a separate friction member loosely mounted in said case and shoes cooperating with opposite sides of said member and engaging certain portions of said wedging means, each of said friction means being adapted to develop friction independently of the other, and the friction member of one of said means being shaped to provide in cooperation with the associated shoes a frictional resistance different in amount from that of the friction member of the other of said means in cooperation with its shoes.

17. In friction shock absorbing mechanism, a case, friction members loosely mounted in said case for movement with respect thereto, a plurality of shoes, spring means opposing movement of said shoes, a wedge in wedging engagement with each of said shoes and means on said case for successively arresting the movement of each of said friction members at a point before the end of the travel of the gear, said parts being so constructed and arranged as to develop friction first between one of said shoes and its associated friction member and then between another shoe and its associated friction member during the travel of said wedge.

18. In a draft gear, a case, a member movable with respect thereto, means brought into action upon a predetermined extent of movement of said member for frictionally opposing further movement of said member, additional means movable in unison with and freely movable beyond said first named means and first brought into frictional action upon movement of said member beyond said predetermined extent for frictionally opposing movement of said member, and spring means in said case opposing movement of said member during said predetermined extent of movement.

19. In a draft gear, the combination of a case, a plurality of groups of friction members and a wedge in engagement therewith for actuating the same, springs in said case opposing movements of said groups, each group comprising a pair of shoes and a friction element therebetween, said friction element being engaged on different sides thereof by the associated shoes, the shoes of said groups cooperating with different portions of said wedge, the members of one of said groups being constructed to provide a frictional resistance different in amount from that of the members of the other of said groups.

ERNEST H. SCHMIDT.